UNITED STATES PATENT OFFICE.

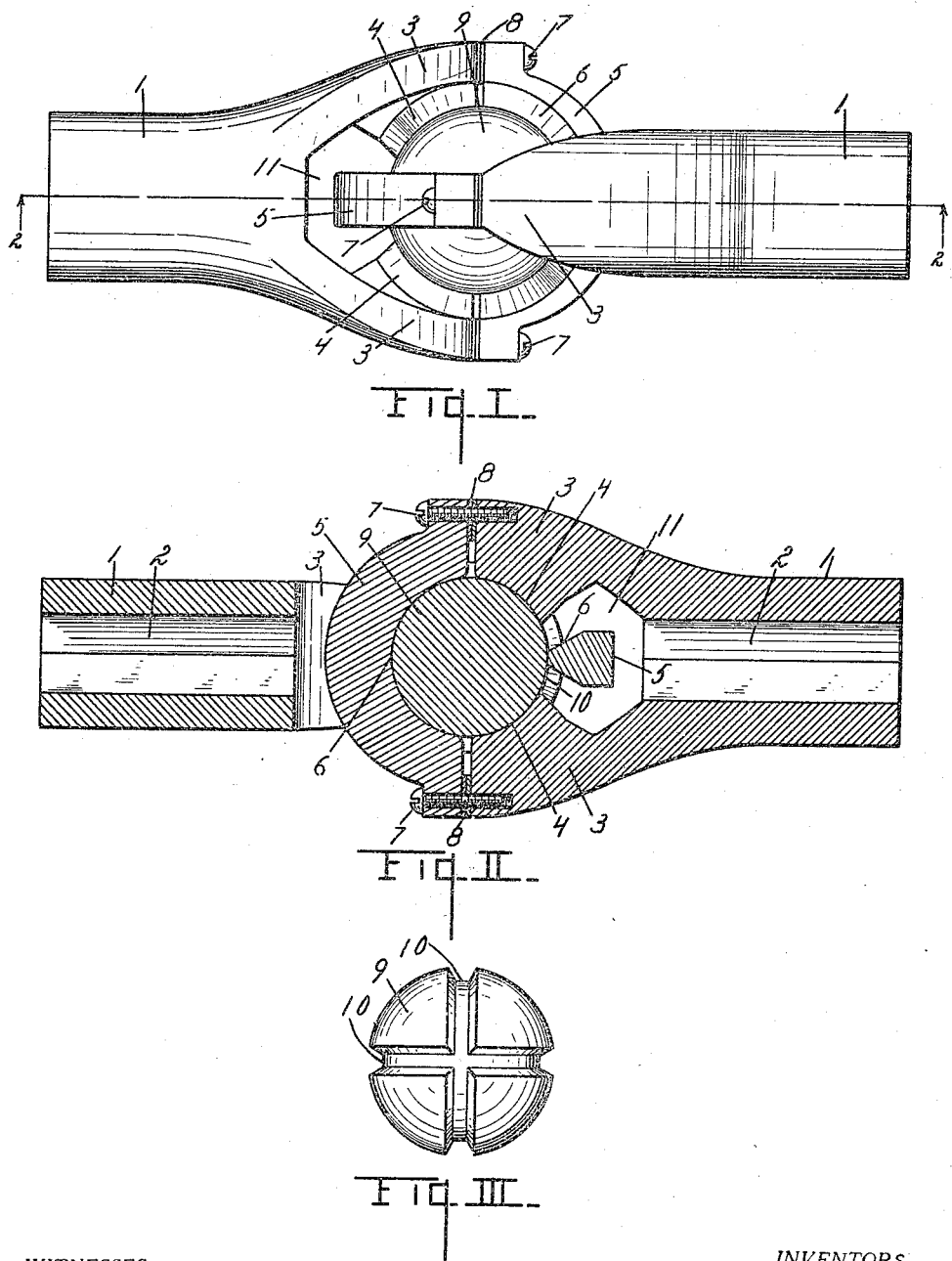

EMANUEL C. DONTJE, BENJAMIN DONTJE, AND CORNELIUS I. DONTJE, OF KALAMAZOO, MICHIGAN.

UNIVERSAL JOINT.

1,224,286.   Specification of Letters Patent.   Patented May 1, 1917.

Application filed September 15, 1916. Serial No. 120,399.

*To all whom it may concern:*

Be it known that we, EMANUEL C. DONTJE, BENJAMIN DONTJE, and CORNELIUS I. DONTJE, citizens of the United States, residing in the city and county of Kalamazoo, State of Michigan, have invented certain new and useful Improvements in Universal Joints, of which the following is a specification.

This invention relates to improvements in universal joints.

The main objects of this invention are:

First, to provide an improved universal joint which may be adjusted to secure the desired bearing fit between the parts and to compensate for wear.

Second, to provide an improved universal joint having a relatively large bearing surface between coacting members.

Third, to provide an improved universal joint having few parts and parts which are simple to produce and assemble and disassemble.

Further objects, and objects relating to structural details, will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawing, forming a part of this specification, in which:

Figure I is a side view of our improved joint.

Fig. II is a central longitudinal section on a line corresponding to line 2—2 of Fig. I.

Fig. III is an end view of the coupling member of the joint.

In the drawing similar reference characters refer to similar parts throughout the several views.

Referring to the drawings, we provide a pair of shaft members 1 which are duplicates except that their sockets 2 are varied to meet the requirements. In the accompanying drawing the sockets are shown conventionally as squared sockets.

Each shaft member is provided with bearing arms 3 having segmental bearing portions 4. The combined arcs of these bearings, as shown in Fig. II, do not exceed a half circle. The yoke-like bearing caps or members 5 are provided with segmental bearing portions 6 which are complemental to the bearing portions 4 of the arms. These bearing yokes 5 are removably secured to the ends of the arms 3 by means of the screws 7.

We preferably insert a plurality of shims 8 which may be removed or increased to secure the desired bearing fit of the shaft members with the coupling member 9, which coupling member has peripheral bearing grooves 10 coacting with the bearings of the shaft member arms and yoke members 5. The bearing grooves 10 are disposed at right angles to each other as clearly shown in Fig. III. The side walls of the bearing grooves are diverged outwardly while the bearing portions of the arms and yoke members are correspondingly formed, that is, they are converged inwardly so as to have a bearing fit in the grooves. By thus shaping these parts the wear may be taken up by the adjustment of the screws 7 and a perfect bearing fit secured and all lost motion between the parts eliminated.

Our improved joint is simple in its parts, which are easily assembled and adjusted to secure the proper bearing fit and which, as stated, may be adjusted to compensate for wear. There is also the advantage of a relatively large bearing area between the bearing parts, the coupling member being substantially encircled by bearings, there being merely a space 11 left between the bearing arms to receive the yoke members and permit the desired swing of the joint.

We have illustrated and described our improved joint in an embodiment we find satisfactory.

We have not attempted to illustrate or describe certain modifications in structural details which we contemplate and which might be desirable to adapt our improvements to particular uses as we believe the disclosure made will enable those skilled in the art to which our improvements relate to embody or adapt the same as conditions may require.

Having thus described our invention, what we claim as new and desire to secure by Letters Patent, is:

1. In a universal joint, the combination of a pair of shaft members each having bearing arms provided with segmental bearings the combined arcs of which do not exceed a half circle, yoke-like bearing members provided with segmental bearings complemental to the bearings of said arms, there being a space between the bearing arms of each shaft member for the bearing member of the other shaft member, a spherical coupling member having peripheral bearing grooves disposed at right angles to each other and coacting with the bearings of said shaft member arms and bearing members, the sides of said bearing grooves being diverged outwardly and the sides of said bearings being converged inwardly to coact therewith, and means for adjustably securing said bearing members to the ends of said bearing arms.

2. In a universal joint, the combination of a pair of shaft members, each having bearing arms provided with segmental bearings, yoke-like bearing members provided with bearings alined with the bearings of said arms, a coupling member having bearing grooves disposed at right angles to each other and coacting with the bearings of said shaft member arms and bearing members, the sides of said bearing grooves being diverged outwardly and the sides of said bearings being converged inwardly to coact therewith, and means for adjustably securing said bearing members to the ends of said bearing arms.

In witness whereof, we have hereunto set our hands and seals in the presence of two witnesses.

EMANUEL C. DONTJE.
BENJAMIN DONTJE. [L. S.]
CORNELIUS I. DONTJE. [L. S.]

Witnesses:
 ARIE ROSKAM,
 DOUWE ROSKAM.

Copies of this patent may be obtained for five cents each, by addressing the "Commissioner of Patents, Washington, D. C."